United States Patent
Yeh et al.

(10) Patent No.: US 7,839,917 B2
(45) Date of Patent: Nov. 23, 2010

(54) RECEIVER OF A CDMA SYSTEM WITH A PATH ALIGNMENT CIRCUIT

(75) Inventors: YenHui Yeh, Hsinchu County (TW); Ganning Yang, Irvine, CA (US)

(73) Assignee: Mediatek Inc., Hsin-Chu (TW)

( * ) Notice: Subject to any disclaimer, the term of this patent is extended or adjusted under 35 U.S.C. 154(b) by 603 days.

(21) Appl. No.: 11/854,570

(22) Filed: Sep. 13, 2007

(65) Prior Publication Data

US 2008/0069190 A1    Mar. 20, 2008

Related U.S. Application Data

(60) Provisional application No. 60/826,032, filed on Sep. 18, 2006.

(51) Int. Cl.
*H04B 1/00* (2006.01)

(52) U.S. Cl. ........................ 375/147; 375/148

(58) Field of Classification Search ................ 375/130, 375/147–148, 152, 316, 340, 347, 349, E1.032; 370/320, 335, 342, 441; 455/57.1, 130, 132, 455/146, 526; 702/80; 708/313, 290, 848
See application file for complete search history.

(56) References Cited

U.S. PATENT DOCUMENTS

| | | | | |
|---|---|---|---|---|
| 6,128,329 A * | 10/2000 | Takakusaki | .................. | 375/140 |
| 6,954,487 B2 * | 10/2005 | Garyantes et al. | ........... | 375/148 |
| 6,977,918 B2 * | 12/2005 | Tran et al. | .................... | 370/349 |
| 6,996,195 B2 * | 2/2006 | Kadous | ..................... | 375/341 |
| 7,190,749 B2 * | 3/2007 | Levin et al. | .................. | 375/346 |
| 7,382,292 B1 * | 6/2008 | Reial | ............................ | 341/61 |
| 7,433,389 B2 * | 10/2008 | Soerensen et al. | ........... | 375/150 |
| 7,676,006 B2 * | 3/2010 | Valle | .......................... | 375/346 |
| 2001/0046221 A1 * | 11/2001 | Ostman et al. | .............. | 370/335 |
| 2005/0089124 A1 * | 4/2005 | Valle | ......................... | 375/346 |
| 2009/0316820 A1 * | 12/2009 | Yang | ......................... | 375/267 |

OTHER PUBLICATIONS

Kawamura et al., Adaptive Transmission Timing Control Using Reservation Packet in Reverse Link for Broadband DS-CDMA Wireless Access,2003, 58th IEEE Vehicular Technology Conference, vol. 2, pp. 877-881.*

* cited by examiner

*Primary Examiner*—Tesfaldet Bocure
*Assistant Examiner*—Lawrence B Williams
(74) *Attorney, Agent, or Firm*—Thomas, Kayden, Horstemeyer & Risley

(57) ABSTRACT

A receiver of a CDMA system, receiving a signal transmitted through a multi-path channel, with a path alignment circuit is disclosed. The path alignment circuit has a pack-based memory device serially inputting samples of low over-sampling rate than that required by the CDMA system and outputting data packs pack by pack to reduce access rate of the memory device. In addition, the path alignment circuit has an interpolation device which reads the data packs from the memory device and performs interpolation to raise the resolution of the low over-sampling samples and generate interpolated samples of high resolution for de-spreading requirement of the CDMA system.

8 Claims, 9 Drawing Sheets

US 7,839,917 B2

RECEIVER OF A CDMA SYSTEM WITH A PATH ALIGNMENT CIRCUIT

CROSS REFERENCE TO RELATED APPLICATIONS

This application claims the benefit of U.S. Provisional Application No. 60/826,032, filed on Sep. 18, 2006, which is incorporated herein by reference.

BACKGROUND OF THE INVENTION

1. Field of the Invention

The present invention relates to a receiver of a CDMA system, and in particular relates to a receiver of CDMA system with a path alignment circuit to efficiently reduce memory size required by the CDMA system.

2. Description of the Related Art

Referring to FIG. 1, the de-spreading process of a CDMA system is schematically shown. In a CDMA (code division multiple access) system such as a WCDMA (wideband CDMA) system, multi-path signals or data ms1~ms3 are de-spread separately by de-spreaders 101~103. Then, the three de-spread signals are combined together by a combiner 104 to generate a demodulated signal with better signal-to-noise ratio. Multi-path signals ms1~ms3 are transmit in different paths and thus have different arrival times to the de-spreaders 101~103 (or to receiver of the CDMA system). To achieve timing alignment in the combiner 104, two basic architectures are widely applied in conventional art.

Referring to FIG. 2A, a first architecture to fulfill the timing alignment is schematically shown. In FIG. 2A, input data Din (usually samples of the multi-path signals 101~103) are respectively buffered in a buffer 201, and then simultaneously de-spread by the de-spreaders 101~103. Referring to FIG. 2B, a second architecture to fulfill the timing alignment is schematically shown. In FIG. 2B, input data Din (usually samples of the multi-path signals 101~103) are incoherently de-spread by the de-spreaders 101~103, and then the de-spread samples are buffered in the buffers 202~204 respectively before being sent to the combiner 104.

In regard to FIG. 2A, the architecture of "buffering before de-spreader" can achieve low cost. To combine the multi-path signals at different arrival times, the input data must be buffered in a memory (i.e., the buffer) for the alignment in the combiner, and the memory size shall be quite huge to accommodate the large delay spread of the multi-path signals in multi-path channel, particular when sampling the multi-path signals with a large sampling rate. Accordingly, a new CDMA receiver with a path alignment circuit is proposed to efficiently reduce memory size required by the CDMA system without degrading modem performance.

BRIEF SUMMARY OF INVENTION

The invention is directed to a receiver of CDMA system with a path alignment circuit to efficiently reduce memory size required by the CDMA system.

An embodiment of the invention proposes a receiver of CDMA system to receive a signal transmitted through a multi-path channel. The receiver comprises a sample device and a path alignment circuit. The sample device operates to sample the signal to produce multi-path samples. The path alignment circuit comprises: a memory device to group the multi-path samples in a plurality of multi-path data packs in sequence and to store the multi-path data packs therein; an interpolation device reading the multi-path data packs from the memory device and performing interpolation to generate multi-path interpolated samples; and a de-spread device receiving and de-spreading the first interpolated samples. Each of the multi-path data packs has a predetermined number of the multi-path samples.

The interpolation device reads out two consecutive packs of the multi-path data packs at a time from the memory device for each of the interpolation. The memory device receives the multi-path samples in serial and outputs the multi-path data packs pack by pack to reduce access rate of the memory.

In addition, the sample device takes samples using a low over-sampling rate, lower than that required by the de-spread device, to reduce memory size of the memory device.

A detailed description is given in the following embodiments with references to the accompanying drawings.

BRIEF DESCRIPTION OF DRAWINGS

The present invention can be more fully understood by reading the subsequent detailed description and examples with references made to the accompanying drawings, wherein.

DETAILED DESCRIPTION OF INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
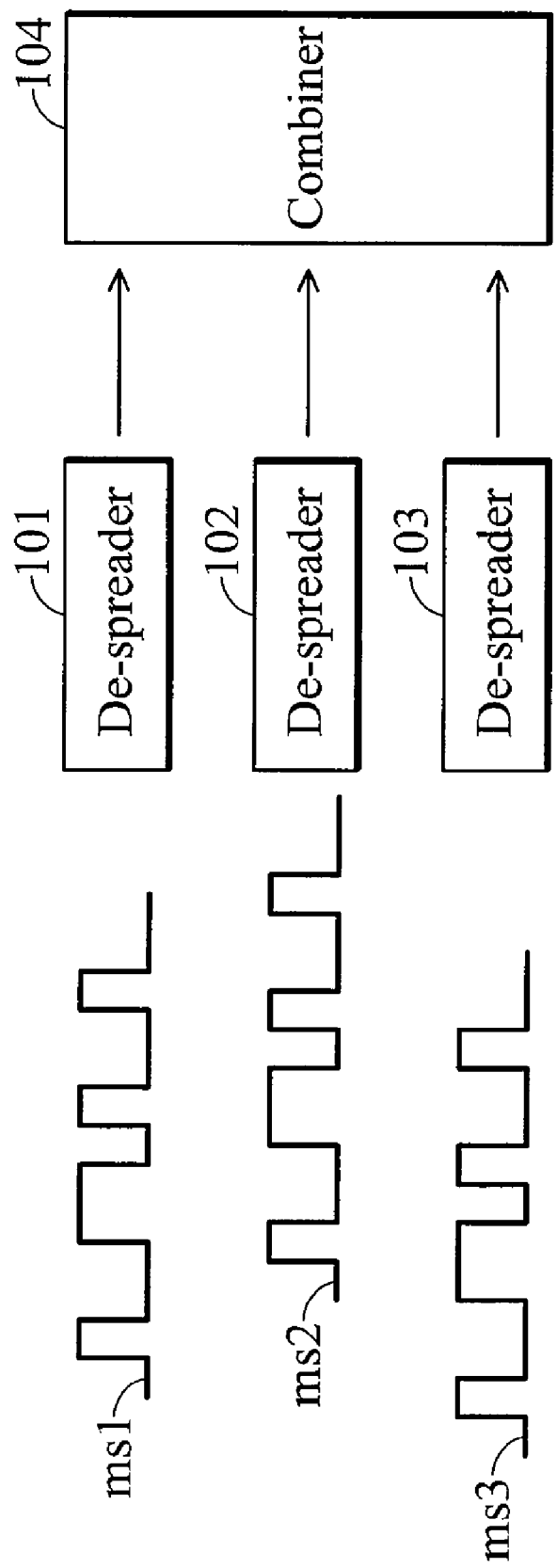
FIG. 1 schematically shows a de-spreading process of a CDMA system.
Figure 2A:
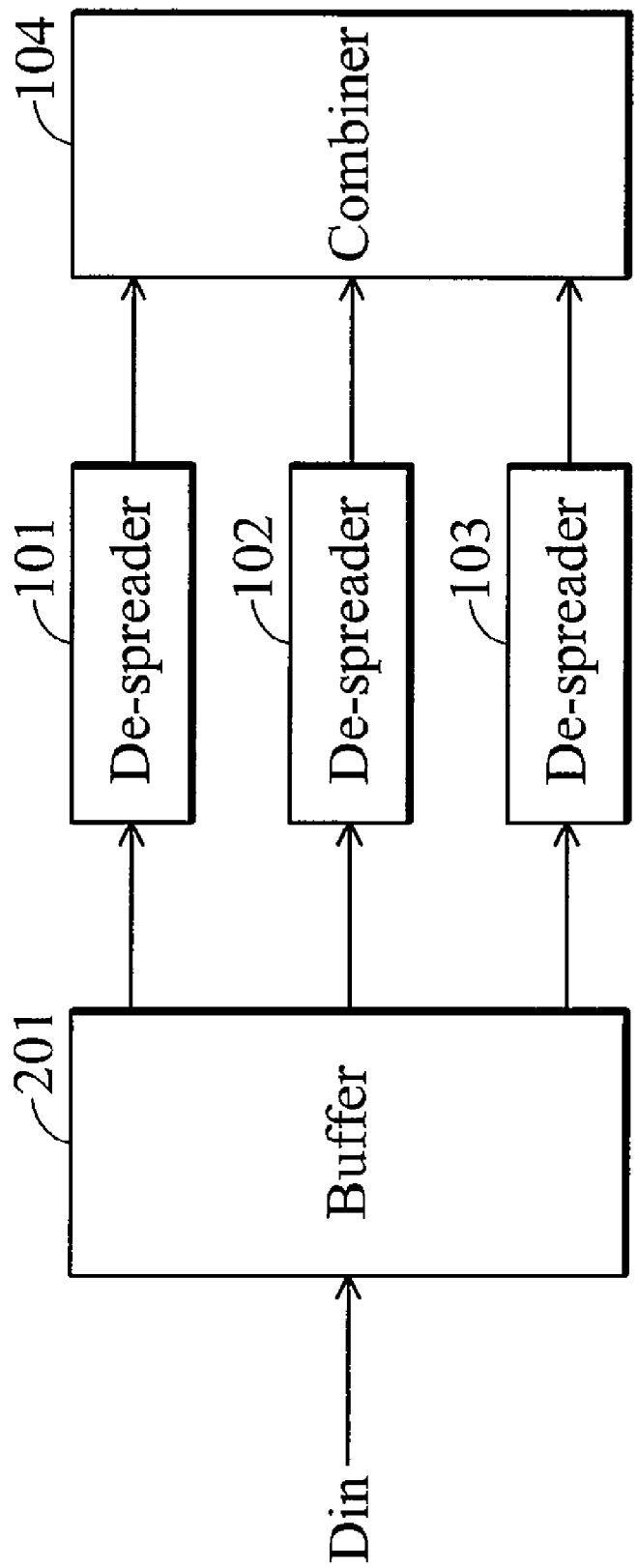
FIG. 2A schematically shows a first architecture to fulfill timing alignment in a conventional CDMA system.
Figure 2B:
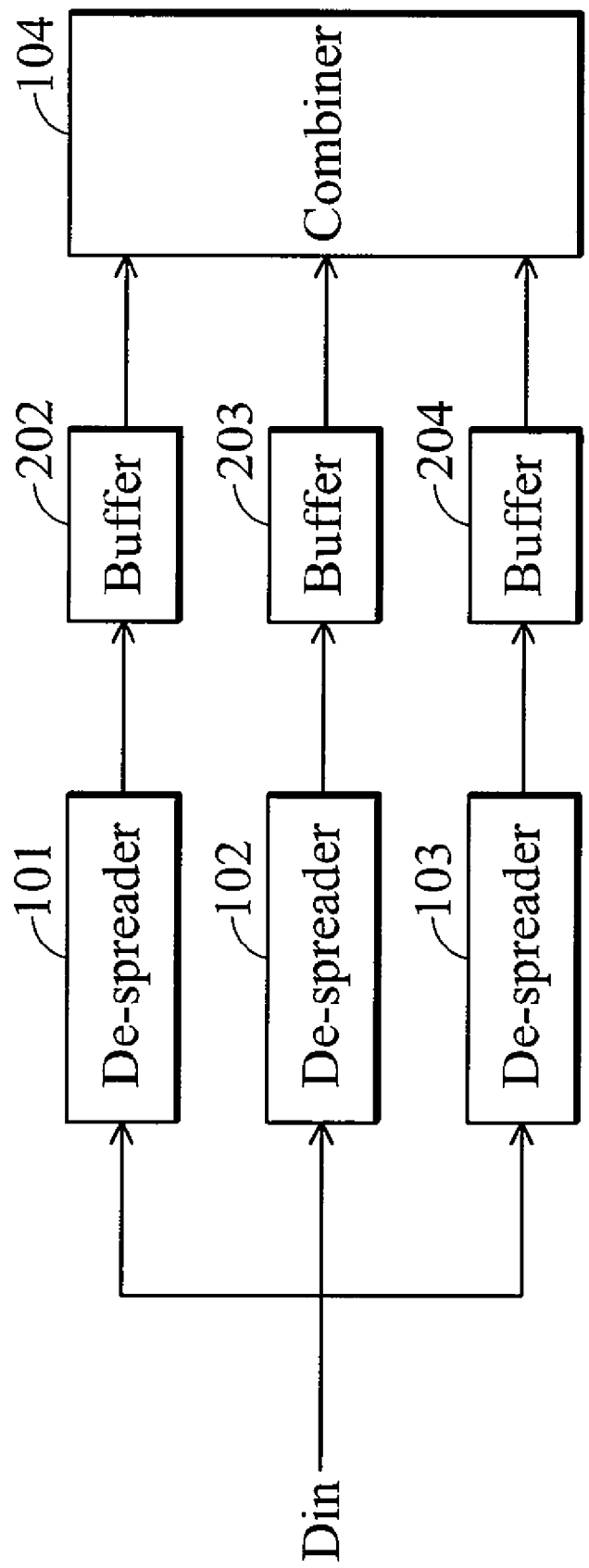
FIG. 2B schematically shows a second architecture to fulfill timing alignment in a conventional CDMA system.
Figure 3:
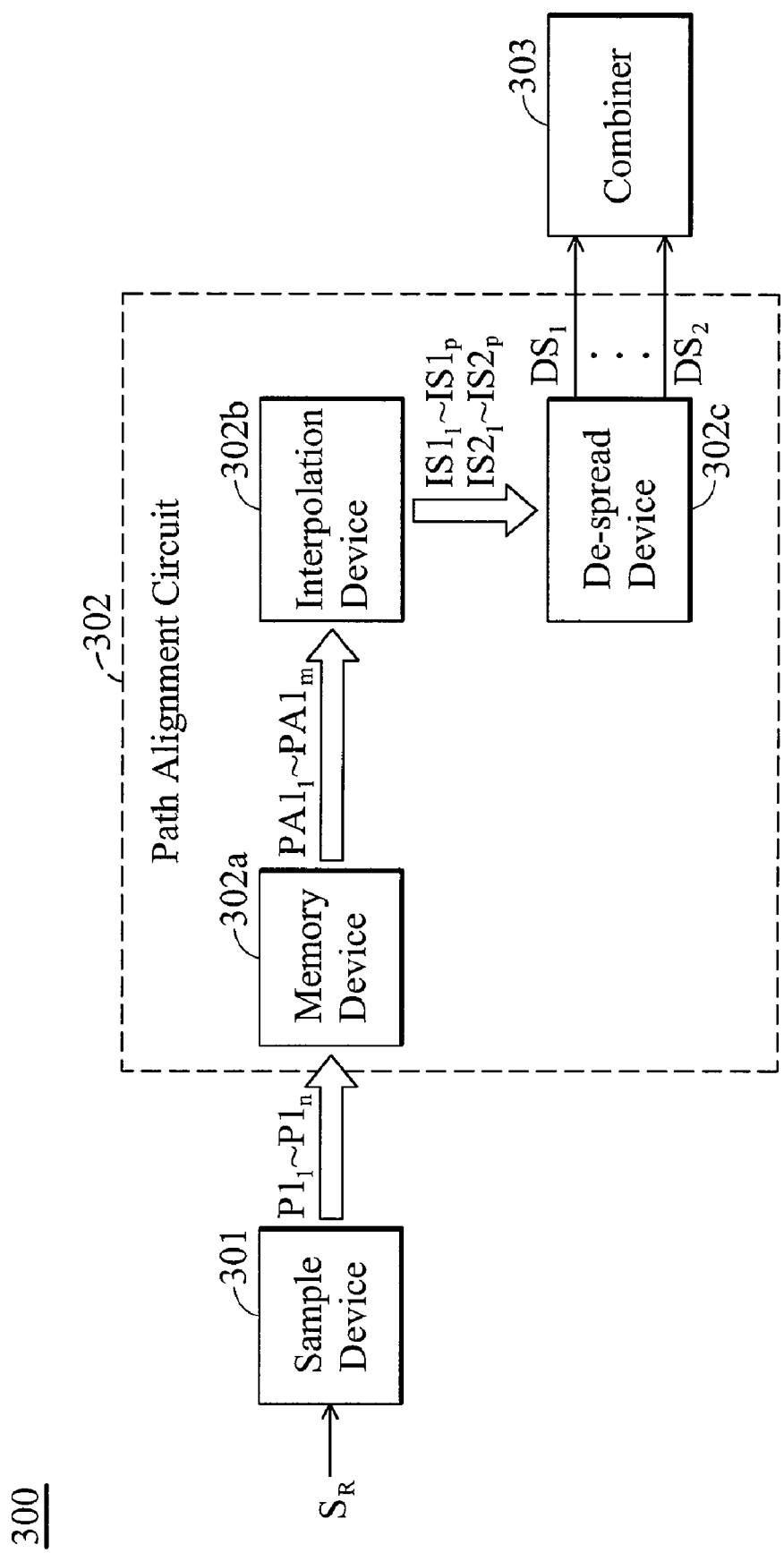
FIG. 3 schematically shows a receiver of a CDMA system, for receiving a signal transmitted through a multi-path channel, according to an embodiment of the invention.

Referring to FIG. 3, a CDMA system receiver for receiving a signal transmitted through a multi-path channel according to an embodiment of the invention is schematically shown. The receiver 300 comprises a sample device 301, a path alignment circuit 302 and a combiner 303. The signal transmitted through the multi-path channel and received by the receiver, has more than one signal components corresponding to different paths (such as path0~pathN) over the multi-path channel.

The sample device 301 samples the received signal SR to produce a plurality of samples. For brevity in description, assume that the multi-path channel has a first path and a second path, but not limited thereto. Therefore, the sample device 301 samples the received signal SR to produce multi-path samples $P1_1 \sim P1_n$.

The path alignment circuit 302 comprises a memory device 302a, an interpolation device 302b and a de-spread device 302c. First, the memory device 302a groups the multi-path samples $P1_1 \sim P1_n$, in sequence, into a plurality of multi-path data packs $PA1_1 \sim PA1_m$. Then, the memory device 302a respectively stores the multi-path data packs $PA1_1 \sim PA1_m$. Each of the multi-path data packs has a predetermined number of the multi-path samples. The memory device may be characterized to have a pack-based architecture.

Figure 4:
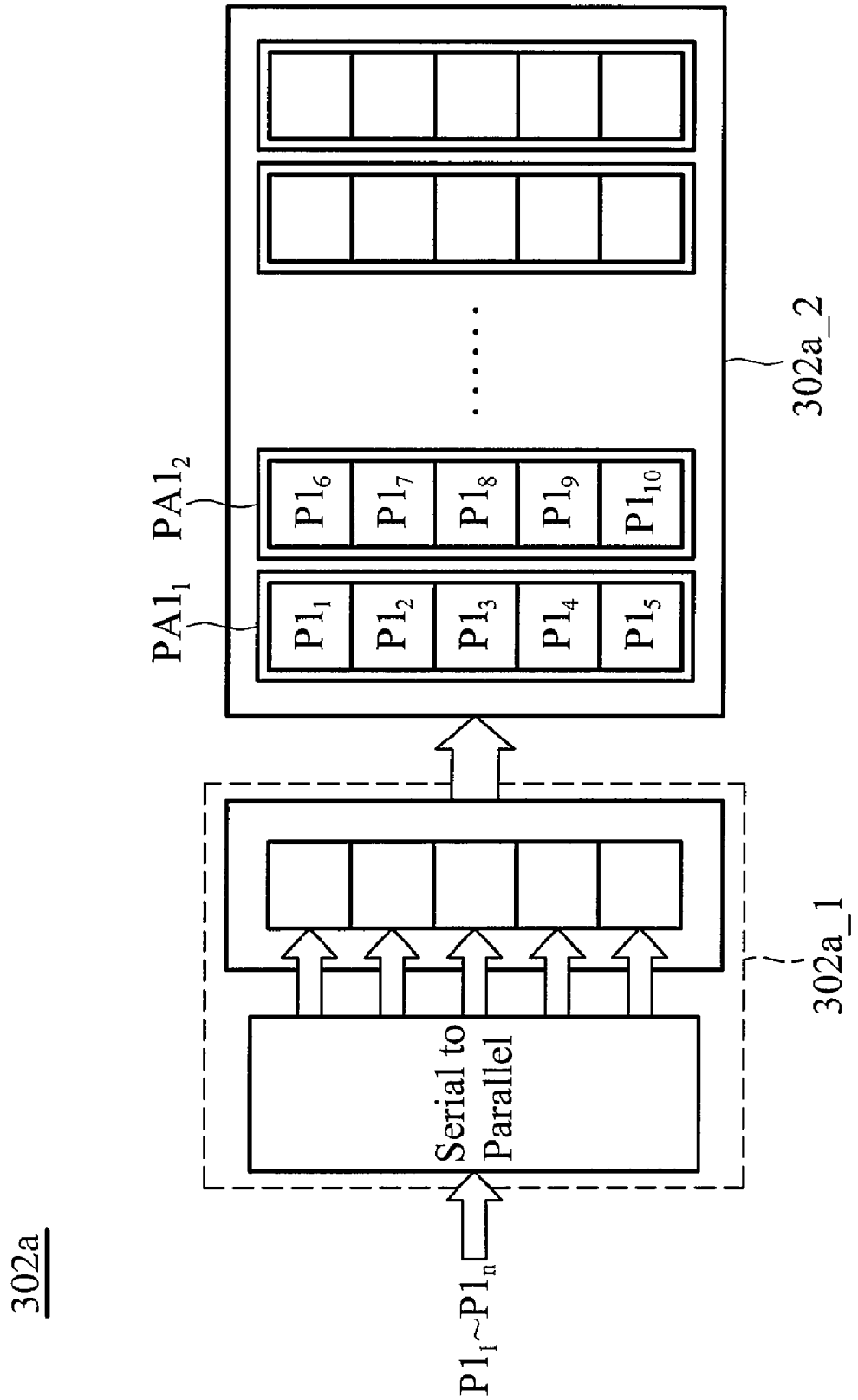
FIG. 4 shows an exemplary architecture of a memory device in a path alignment circuit according to the invention.

Referring to FIG. 4, an exemplary architecture of a memory device 302a is shown. The multi-path samples $P1_1 \sim P1_n$ are serially inputted to the memory device 302a. The memory device 302a may comprise a serial-to-parallel interface or an input buffer 302a_1 which groups (or collects) every specific number of the multi-path samples as multi-path data packs, and then stores the multi-path data packs in the memory portion 302a_2. In this embodiment, the specific number is five as an example, but not limited thereto. In FIG. 4, the multi-path samples $P1_1 \sim P1_5$, $P1_6 \sim P1_{10}$ and so on are sequentially grouped as the multi-path data packs $PA1_1$, $PA1_2$ and so on. Then, the multi-path data packs $PA1_1$, $PA1_2$, and so on, are stored in the memory portion 302a_2.

Figure 5:
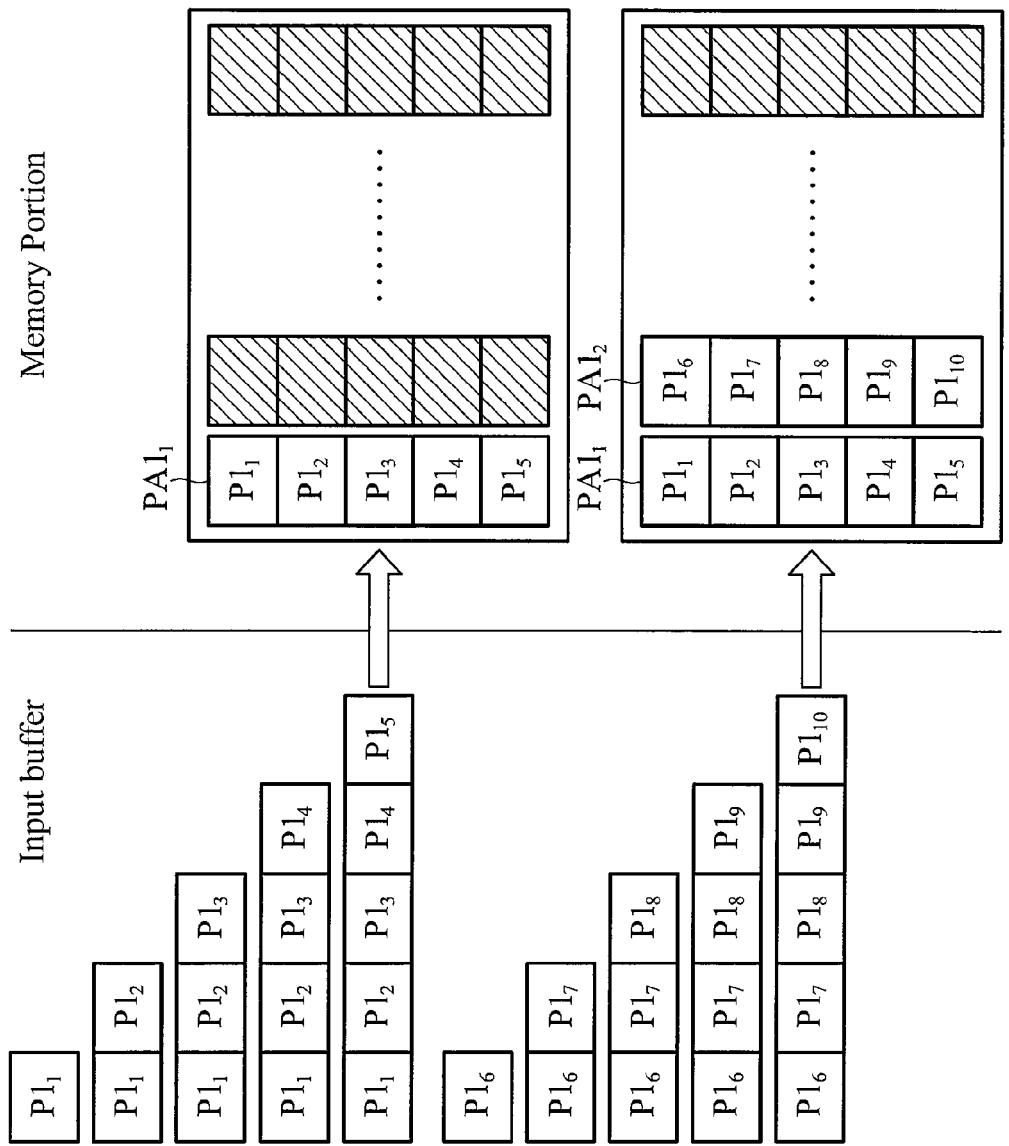
FIG. 5 schematically shows a memory write process of the memory device according to the invention.

Referring to FIG. 5, a memory write process of the memory device according to the invention is schematically shown. In FIG. 5, the input buffer (or serial-to-parallel interface) does not write data to the memory portion until multi-path samples $P1_1 \sim P1_5$ are collected as the multi-path data pack $PA1_1$. Similarly, the input buffer does not write data to the memory portion until multi-path samples $P1_6 \sim P1_{10}$ are collected as the first data pack $PA1_2$. Thus, the multi-path samples are written and stored to the memory device pack by pack. Based on this pack-writing architecture, the memory device achieves lower writing access rate. In this embodiment, because there are five multi-paths samples in one data pack, the input buffer transfers the five multi-path samples into the memory portion after the last multi-path sample of the five has been collected, the access rate might be ⅕ of the prior processing, in which the multi-path samples are written into the memory one by one.

Figure 6:
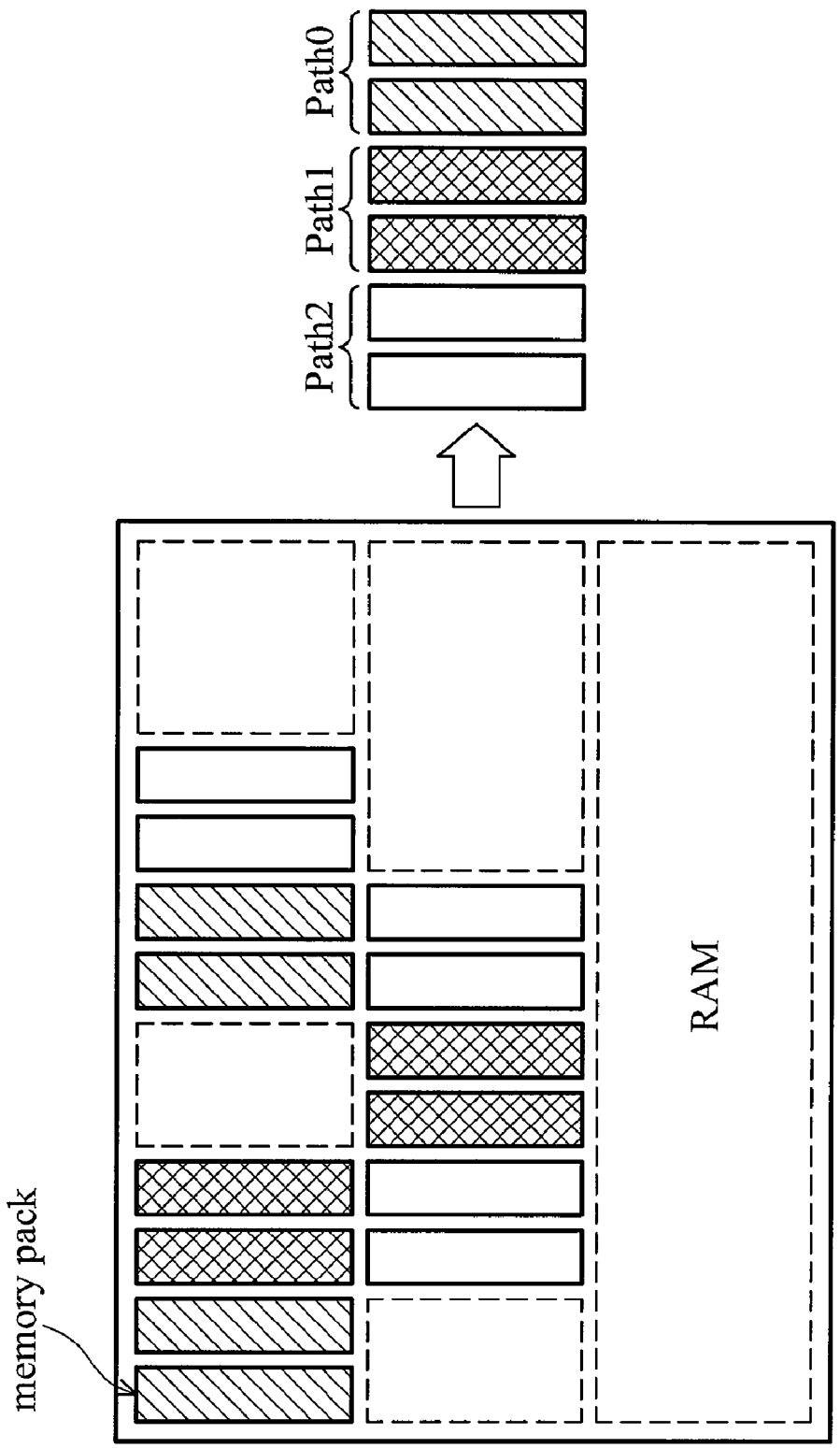
FIG. 6 schematically shows memory allocation and a memory read process of the memory device according to the invention.

Referring to FIG. 6, memory allocation of the memory device according to the invention is schematically shown. The data packs may be allocated somewhere in the memory device 302a, as shown in FIG. 6, but is not limited thereto. It should be noted that the memory allocation of data packs would be predefined to sequentially output data packs belonging to the same path. For example, the memory device 302a performs serial data outputting pack by pack, i.e., serially outputting data packs of path 0, path 1, and path 2, and so on. In one embodiment, the CDMA system receiver processes multi-path data (or the signal transmitted through the multi-path channel) according to following order: chip0 path0→chip0 path1→ . . . →chip0 pathN, chip1 path0→chip1 path1→ . . . →chip1 pathN, and so on. The receiver first processes all data from the multi-paths path0~pathN corresponding to a chip interval chip0, and then processes, in sequence, all data from the multi-paths path0~pathN corresponding to a chip interval chip1. Similarly, the rest of chip intervals such as chip2, chip3 . . . are carried out the same operation.

To reduce cost, RAM (random access memory) device is adopted to implement the memory device 302a instead of registers. For a CDMA system such as a WCDMA system, the RAM size must exceed path_window_size×WL×0×OSR, where path_window_size means multi-path delay spread window, WL means word length, OSR means over-sampling rate and the factor '2' is to take I and Q channel into consideration. Therefore, lower over-sampling rate is adopted by the sample device 301 and the memory device 302a to reduce the RAM size. However, high resolution is necessary for the receiver 300, and therefore the interpolation device 302b described hereinafter is introduced to achieve high resolution before de-spreading the multi-path signals.

Referring back to FIG. 3, the interpolation device 302b reads or accesses the multi-path data packs $PA1_1 \sim PA1_m$ from the memory device 302a. Multi-path samples $P1_1$, $P1_2$, $P1_3$, $P1_4$, $P1_5$, $P1_6$ . . . , are inputted and stored in the memory device 302a in data packs. It is noted that multi-path samples stored at different position are taken according to different timing with respect to different paths to deal with the same chip of different paths. Here, assume a delay time exists between the first and second paths over the multi-path channel, the second path delays two samples with respect to the first path, and the first chip of the first path locates at $P1_2$. Thus, to deal with data in the first chip of the first and second paths (path1, path2), the samples read-out order is as follows: $P1_2$ (for path1)→$P1_4$ (for path2)→$P1_3$ (for path1)→$P1_5$ (for path2)→$P1_4$ (for path1)→$P1_6$ (for path2) and so on. Thus, first (or second) data packs among the multi-path data packs are read out to obtain required multi-path samples therein to process chips of first and second paths. The first and second data packs may be the same data pack or different data packs. Accordingly, the interpolation device 302b uses multi-path samples of first data packs among the multi-path data packs $PA1_1 \sim PA1_m$ to perform interpolation to generate first interpolated samples $IS1_1 \sim IS1_p$. Also, the interpolation device 302b uses multi-path samples of second data packs among the multi-path data packs $PA1_1 \sim PA1_m$ to perform interpolation to generate second interpolated samples $IS2_1 \sim IS2_p$.

Figure 7:
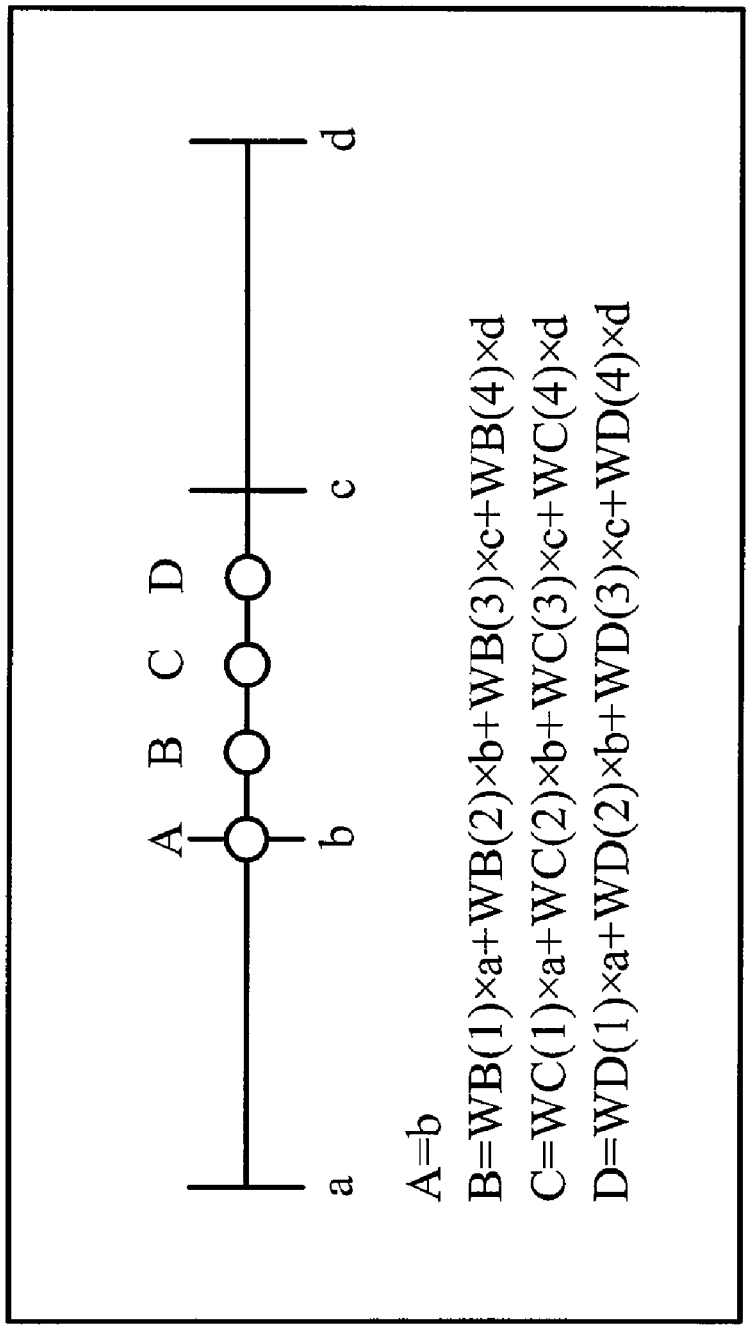
FIG. 7 shows an exemplary operation scheme of the interpolation device, using 4 samples for interpolation and providing 4 times interpolation according to the invention.

Referring to FIG. 7, an exemplary operation scheme of the interpolation device 302b is shown. Here, a, b, c and d are input data at low over-sampling rate such as the multi-path samples. A, B, C and D are interpolated data at high resolution, and WB(1)~WB(4), WC(1)~WC(4) and WD(1)~WD(4) are interpolation coefficients. The interpolation device 302b uses 4 samples a, b, c and d serving as interpolation window to generate any one of the interpolated data A, B, C or D, according to the formula shown in FIG. 7. In the exemplary embodiment of the invention, two data packs are needed for interpolating the multi-path samples, since the interpolation point is not always in the middle of the data packs, as shown in FIG. 7.

Figure 8:
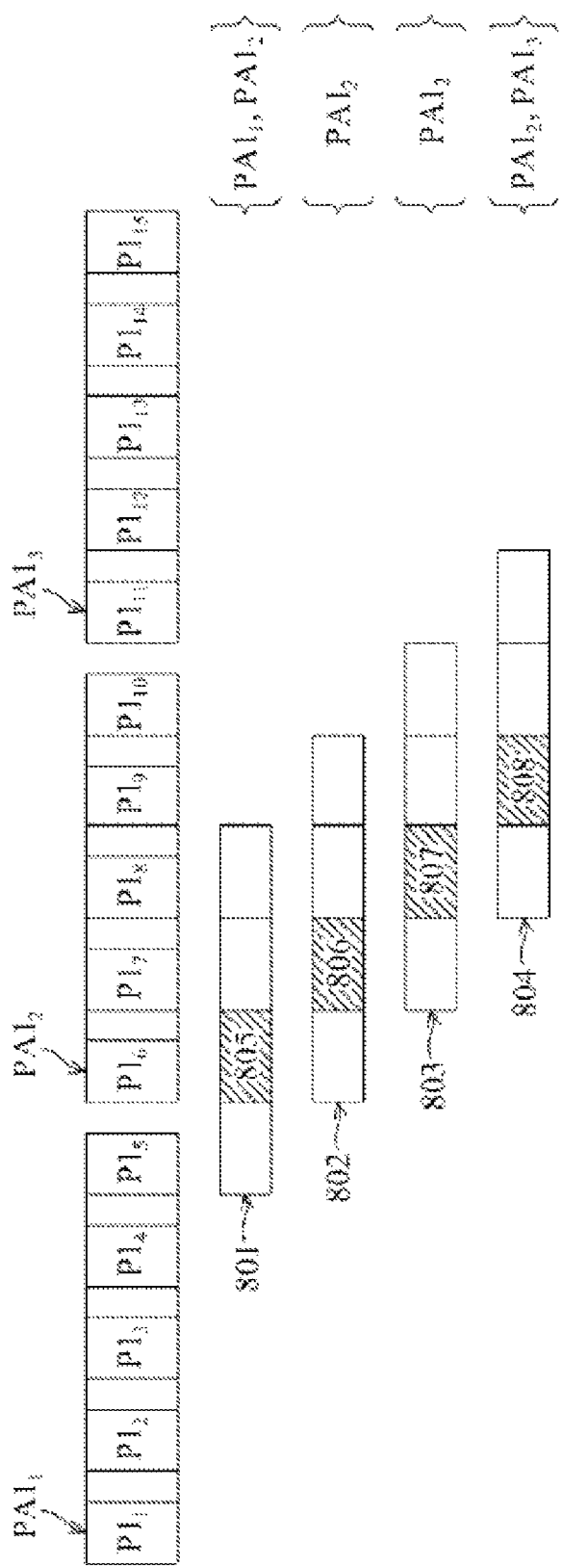
FIG. 8 schematically shows a pack-reading process when interpolating the multi-path samples according to the invention.

Referring to FIG. 8, a pack-reading process when interpolating the multi-path samples as an example, according to the invention is schematically shown. In FIG. 8, 801~804 represent interpolation windows required by the interpolation device 302b to respectively carry out interpolation at the positions 805~808 depicted in slash line. When the interpolation device 302b performs interpolation to the multi-path samples at the position 805 (between $P1_6 \sim P1_7$), based on description and rule in FIG. 7, the interpolation window 801 comprises multi-path samples $P1_5 \sim P1_8$ (equivalent to a~b in FIG. 7), and any one of the interpolated data A, B, C, or D can be produced. Therefore, the interpolation device 302b requires to read two multi-path data packs $PA1_1$ and $PA1_2$, getting the interpolation window 801 ($P1_5 \sim P1_8$) to generate any one of the interpolated first data A, B, C or D by using the multi-path samples $P1_5$ in multi-path data pack $PA1_1$ and $P1_6 \sim P1_8$ in multi-path data pack $PA1_2$. Similarly, the interpolation device 302b requires to read one multi-path data packs $PA1_2$, getting the interpolation window 802 ($P1_6 \sim P1_9$) to generate any one of the interpolated first data A, B, C or D at the position 806 (between $P1_7 \sim P1_8$) by using the multi-path samples $P1_6 \sim P1_9$ in $PA1_2$. Also, the interpolation device 302b requires to read one multi-path data packs $PA1_2$, getting the interpolation window 803 ($P1_7 \sim P1_{10}$) to generate any one of the interpolated first data A, B, C or D at the position 807 (between $P1_8 \sim P1_9$) by using the multi-path samples $P1_7 \sim P1_{10}$ in $PA1_2$. Also, the interpolation device 302b requires to read two multi-path data packs $PA1_2$ and $PA1_3$, getting the interpolation window 804 ($P1_8 \sim P1_{11}$) to generate any one of the interpolated first data A, B, C or D at the position 808 (between $P1_9 \sim P1_{10}$) by using the multi-path samples $P1_8 \sim P1_{10}$ in $PA1_2$ and $P1_{11}$ in $PA1_3$. In the invention, each interpolation may need to adopt samples in one or two data packs. In addition, for each interpolation, the require samples are completely read from the memory device, which provides memory-less operation for the interpolation device and reduces control complexity of the interpolation and memory.

Selecting pack size (or number of samples) of the data pack must guarantee that two data packs are enough for the interpolation requirement such that the memory access rate of the interpolation device can be reduced. In this exemplary embodiment, pack size of 5 samples are the minimal requirement.

Referring back to FIG. 3, the de-spread device 302c receives and de-spreads the first interpolated samples $IS1_1 \sim IS1_p$ and the second interpolated samples $IS2_1 \sim IS2_p$, to generate a first and a second de-spread signal $DS_1$ and $DS_2$. The de-spread signal $DS_1$ corresponds to the signal component from the first path and the de-spread signal $DS_2$ corresponds to the signal component from the second path. The combiner 303 combines the first and second de-spread signals $DS_1$ and $DS_2$ and outputs a target signal with better signal-to-noise ratio. The de-spread device 302c may comprise a first and a second de-spreader (both not shown in FIG. 3) to respectively de-spread the first and second interpolated samples using a first and a second de-spread pattern, wherein the second de-spread pattern is a delayed version of the first de-spread pattern.

Assume N samples are needed for each interpolation, total N×path_num samples are required to be accessed from the memory device by the interpolation device within one-chip duration, where path_num means number of multiple paths. The memory access rate is quite high if I/O port of the memory device is designed only for one sample. By the pack-based architecture of the memory device, the memory access rate for the interpolation device can be reduced to 2×path_num×R_chip from N×path_num×R_chip, where R_chip means chip rate of the CDMA system.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A receiver of a CDMA system to receive a signal transmitted through a multi-path channel, comprising:
    a sample device sampling the signal to produce multi-path samples; and
    a path alignment circuit comprising:
        a memory device grouping the multi-path samples in a plurality of multi-path data packs in sequence and storing the multi-path data packs therein, each of the multi-path data pack having a predetermined number of the multi-path samples;
        an interpolation device reading first data packs among the multi-path data packs from the memory device and performing interpolation to generate first interpolated samples; and
        a de-spread device receiving and de-spreading the first interpolated samples.

2. The receiver as claimed in claim 1, wherein the interpolation device reads out two consecutive packs of the multi-path data packs at a time from the memory device for each of the interpolation.

3. The receiver as claimed in claim 1, wherein the memory device receives the multi-path samples in serial and outputs the multi-path data packs pack by pack, to reduce access rate of the memory device.

4. The receiver as claimed in claim 1, wherein the sample device takes samples using a low over-sampling rate lower than that required by the de-spread device, to reduce memory size of the memory device.

5. The receiver as claimed in claim 4, wherein the interpolation device generates the first interpolated samples with higher resolution than that of the multi-path samples to meet requirement of the de-spread device without degrading performance.

6. The receiver as claimed in claim 1, wherein the interpolation device further reads second data packs among the multi-path data packs from the memory device to generate second interpolated samples.

7. The receiver as claimed in claim 6, wherein the de-spread device comprises at least a first de-spreader to de-spread the first interpolated samples using a first de-spread pattern, and a second de-spreader to de-spread the second interpolated samples using a second de-spread pattern which is a delayed version of the first de-spread pattern.

8. The receiver as claimed in claim 7, further comprising a combiner to combine the first interpolated samples after de-spreading and the second interpolated samples after de-spreading.

* * * * *